US011623565B1

(12) United States Patent
Okunoye

(10) Patent No.: US 11,623,565 B1
(45) Date of Patent: Apr. 11, 2023

(54) INDESTRUCTIBLE AUTO VEHICLE EVENT RECORDING BOX

(71) Applicant: Olubukola Okunoye, Houston, TX (US)

(72) Inventor: Olubukola Okunoye, Houston, TX (US)

( * ) Notice: Subject to any disclaimer, the term of this patent is extended or adjusted under 35 U.S.C. 154(b) by 299 days.

(21) Appl. No.: 17/090,580

(22) Filed: Nov. 5, 2020

(51) Int. Cl.
B60R 1/00 (2022.01)
B60R 11/04 (2006.01)
B60K 37/04 (2006.01)
B60R 11/00 (2006.01)

(52) U.S. Cl.
CPC .............. B60R 1/00 (2013.01); B60K 37/04 (2013.01); B60R 11/04 (2013.01); B60K 2370/63 (2019.05); B60K 2370/691 (2019.05); B60K 2370/81 (2019.05); B60R 2011/0005 (2013.01); B60R 2300/105 (2013.01); B60R 2300/302 (2013.01); B60R 2300/408 (2013.01)

(58) Field of Classification Search
CPC . B60R 11/04; B60R 2300/105; B60R 25/302; B60R 25/305; B60R 2011/0005; B60K 37/04
See application file for complete search history.

(56) References Cited

U.S. PATENT DOCUMENTS 5,978,017 A * 11/1999 Tino .......................... B60Q 1/52
348/E7.086
8,520,070 B1 * 8/2013 Englander ................ H04N 5/77
348/148
9,172,903 B1 * 10/2015 Englander ............... G06V 20/56
9,315,152 B1 4/2016 Maestas
9,635,319 B1 * 4/2017 Englander ............... B60R 11/04
10,091,453 B1 * 10/2018 Englander ................ H04N 5/77
10,097,740 B2 * 10/2018 Sugimura ............... B60R 11/04
10,311,749 B1 6/2019 Kypri
10,666,893 B1 * 5/2020 Englander ........... G07C 5/0866
11,115,587 B2 * 9/2021 Hayashi ................. G06V 20/56
11,425,329 B2 * 8/2022 Hayashi ................. G06F 3/013
(Continued)

FOREIGN PATENT DOCUMENTS

CN 110035211 A * 7/2019 .......... H04N 5/2252
JP 2018196066 A * 12/2018
(Continued)

Primary Examiner — John Villecco
(74) Attorney, Agent, or Firm — Sanchelima & Associates, P.A.; Christian Sanchelima; Jesus Sanchelima

(57) ABSTRACT

An indestructible auto vehicle event recording box comprising a dash-mounted system includes a data storage device coupled to an outward facing camera. The system further includes an interior facing camera, a microphone for recording sound, and a GPS-based locating system. The system automatically records audio and video during vehicle accidents and criminal activity. The features of the system could record collisions and other incidents to provide a clear indication of who was at fault while also protecting the driver against unwarranted accusations and charges. The system further includes an internal tracker to detect a location of the vehicle having the system. An outer portion of the housing also includes a USB slot which receives a USB cable to download the data recorded by the device onto an external device.

10 Claims, 3 Drawing Sheets

(56) References Cited

U.S. PATENT DOCUMENTS

| | | | | |
|---|---|---|---|---|
| 2005/0282504 | A1* | 12/2005 | Yeh | H04N 5/772 |
| | | | | 386/E5.072 |
| 2008/0239077 | A1* | 10/2008 | Kurylo | H04N 7/18 |
| | | | | 348/148 |
| 2010/0123779 | A1* | 5/2010 | Snyder | G07C 5/0866 |
| | | | | 386/241 |
| 2010/0265328 | A1* | 10/2010 | Chou | H04N 5/2253 |
| | | | | 348/373 |
| 2011/0187861 | A1* | 8/2011 | Totani | G07C 5/0891 |
| | | | | 348/148 |
| 2016/0119514 | A1* | 4/2016 | Sugimura | B60R 25/305 |
| | | | | 348/148 |
| 2020/0259997 | A1* | 8/2020 | Hayashi | G06V 40/166 |
| 2020/0275022 | A1* | 8/2020 | Shang | H04N 7/18 |

FOREIGN PATENT DOCUMENTS

| | | | |
|---|---|---|---|
| JP | 2020145687 A | * | 9/2020 |
| KR | 20110112506 A | * | 10/2011 |

* cited by examiner

INDESTRUCTIBLE AUTO VEHICLE EVENT RECORDING BOX

BACKGROUND OF THE INVENTION

1. Field of the Invention

The present invention relates to a vehicle event recorder and, more particularly, to an indestructible auto vehicle event recording box that includes a dash mounted system with an outward facing camera and an interior facing camera.

2. Description of the Related Art

Several designs for a vehicle event recorder have been designed in the past. None of them, however, include an indestructible auto vehicle event recording box comprising a dash-mounted system having a data storage device coupled to an outward facing camera. The system further includes an interior facing camera, a microphone for recording sound, and a GPS-based locating system. The system automatically records audio and video during vehicle accidents and criminal activity. The features of the system could record collisions and other incidents to provide a clear indication of who was at fault while also protecting the driver against unwarranted accusations and charges. The system further includes an internal tracker to detect a location of the vehicle having the system. An outer portion of the housing also includes a USB slot which receives a USB cable to download the data recorded by the device onto an external device. In one embodiment, the system is integrated into the top center of a vehicle dashboard. Further the outward facing camera may be provided as a wide-angle camera for peering through the front-windshield at the roadway, traffic, and surrounding areas. It is known that drivers often get into car accidents and do not have proper evidence to support their claims regarding the accident. This situation renders it difficult to determine who is at fault in a car accident. Therefore, there is a need for an indestructible auto vehicle event recording box to properly record event's surrounding a vehicle to obtain proper evidence in the event of a car accident.

Applicant believes that a related reference corresponds to U.S. Pat. No. 10,311,749 issued for a safety score based on compliance and driving, that records and compares driving events and includes a set of sensors. The reference further discloses video records, audio recorders, accelerometers, gyroscopes, vehicle state sensors, and a GPS module. Applicant believes that another related reference corresponds to U.S. Pat. No. 9,315,152 issued for a security system and method for monitoring the inside of a vehicle that includes a cabin module positioned inside the vehicle having a camera to record video and a microphone to record audio therein, as well as a GPS module. However, the cited references differ from the present invention because they fail to show a vehicle recording system comprising a dash mounted system having a data storage device coupled to an outward facing camera and an inward camera.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an indestructible auto vehicle event recording box which provides an automatic way to record vehicle accidents and incidents allowing a user to easily determine who is at fault, thereby providing added protection and peace of mind.

It is another object of this invention to provide an indestructible auto vehicle event recording box which includes a tracker, in case of vehicle theft, thereby allowing law enforcement to easily track and retrieve the vehicle in the event of a robbery.

It is still another object of the present invention to provide an indestructible auto vehicle event recording box which prevents wrongful conviction of innocent people due to lack of concrete evidence and wrong eyewitness testimony.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
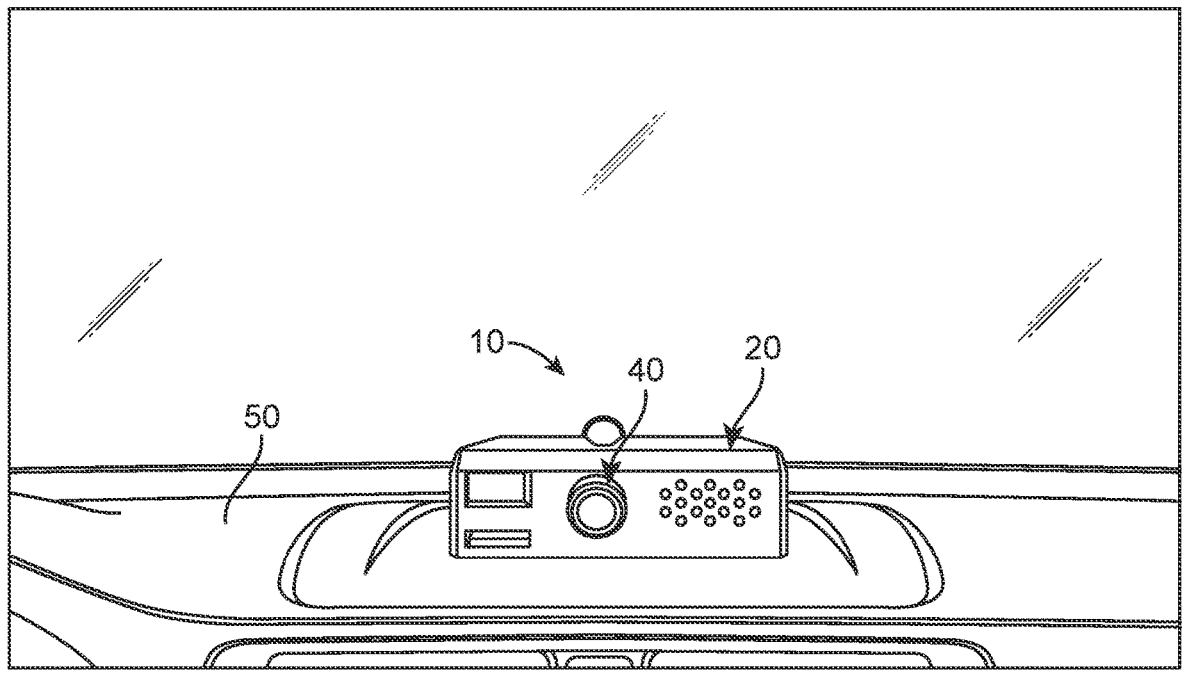
FIG. 1 represents an operational isometric view of indestructible auto vehicle event recording box 10 mounted within a vehicle in accordance to an embodiment of the present invention.

Referring now to the drawings, where the present invention is generally referred to with numeral 10, it can be observed A system for an indestructible auto vehicle event recording box 10 which basically includes a housing assembly 20 and a communication assembly 40.

Housing assembly 20 includes a base 22 which may be provided as a rectangular shape. Base 22 can properly be observed in FIG. 2 of the provided figures where base 22 is seen as a foundation for housing assembly 20. In the present embodiment, base 22 is made of a sturdy metal material which will withstand vehicle accidents. In one embodiment, base 22 is made of a chromium metal material which rates high on the Mohs hardness scale. A material that rates higher than 5 on the scale is preferred, however, other material may be used. Other embodiments may feature base 22 being made of other metal materials such as tungsten, titanium, or other metals. As a result, the present invention has an indestructible nature as it may withstand heavy blunt force trauma and survive harsh car accidents. Further, base 22 includes a bottom end that is mounted onto a dashboard of a vehicle 50. FIG. 1 effectively shows base 22 mounted onto the dashboard. As observed, base 22 may be mounted to a top end of a platform that is provided on the top end of the dashboard within vehicle 50. In one implementation, a bottom end of base 22 is provided with an adhesive material to be mounted onto the platform. Other implementations may feature mounting members in the form of hook and loop fasteners, snap buttons, or other mounting means on the bottom end to be received by the platform.

Housing assembly 20 also includes a slanted front end 24 and a slanted back end 25. The configuration of the slanted front end 24 and slanted back end 26 can be properly observed in FIG. 5 of the provided drawings. It can be observed that slanted front end 24 extends from a front edge of base 22. Slanted front end 24 then slants inwardly toward base 22. It can also be observed that slanted back end 26 extends from a back edge of base 22. Slanted back end 24 then slants inwardly toward base 22. A slanted top portion then joins slanted front end 24 and slanted back end 26 together. Sidewalls 26 are then provided extending upwardly from sides of base 22 to form an enclosure. In the present embodiment, slanted front end 24 and slanted back end 25, and sidewalls 26 are also made of the same durable metal materials as was described for base 22. Slanted front end 24 will be configured to hold a majority of the elements to be provided for communication assembly 40. It is also observed that slanted front end 24 slants at an angle greater than an angle of the slanted back end 25.

Figure 2:
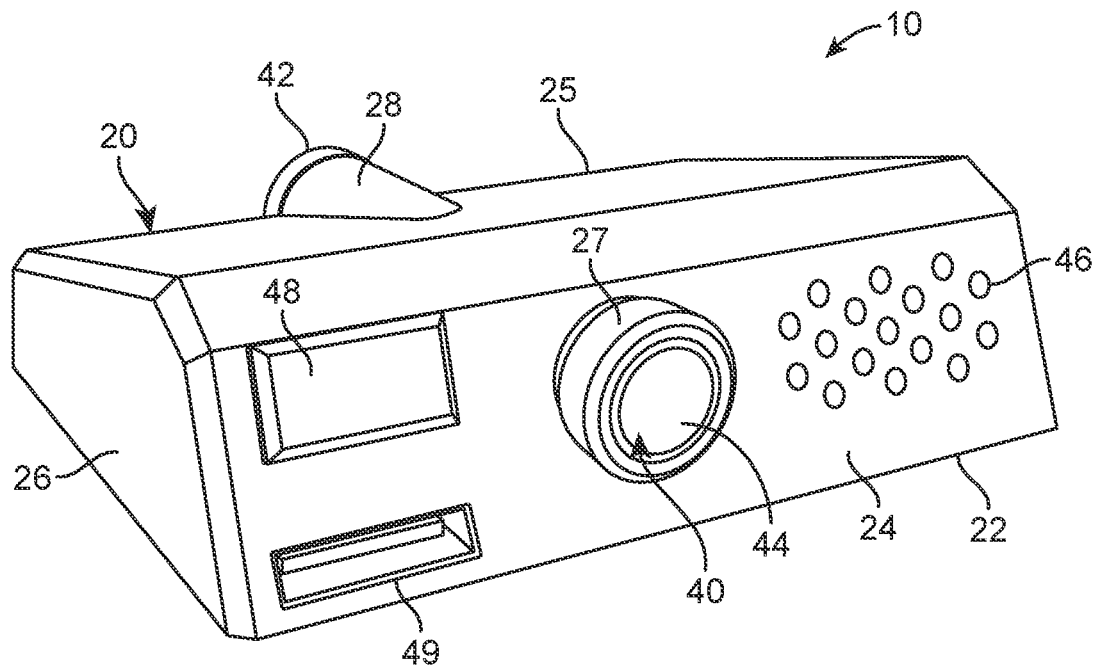
FIG. 2 shows represents an isometric view of indestructible auto vehicle event recording box 10 having a housing assembly 20 and a communication assembly 40 in accordance to an embodiment of the present invention.
Figure 3:
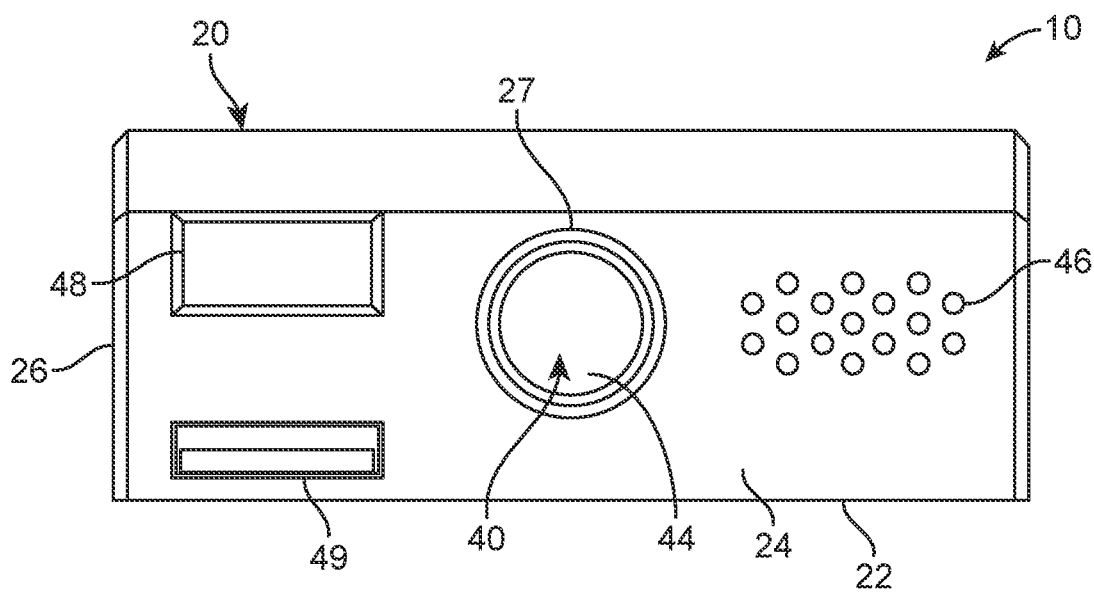
FIG. 3 illustrates a front view of housing assembly 20 in accordance to an embodiment of the present invention.
Figure 4:
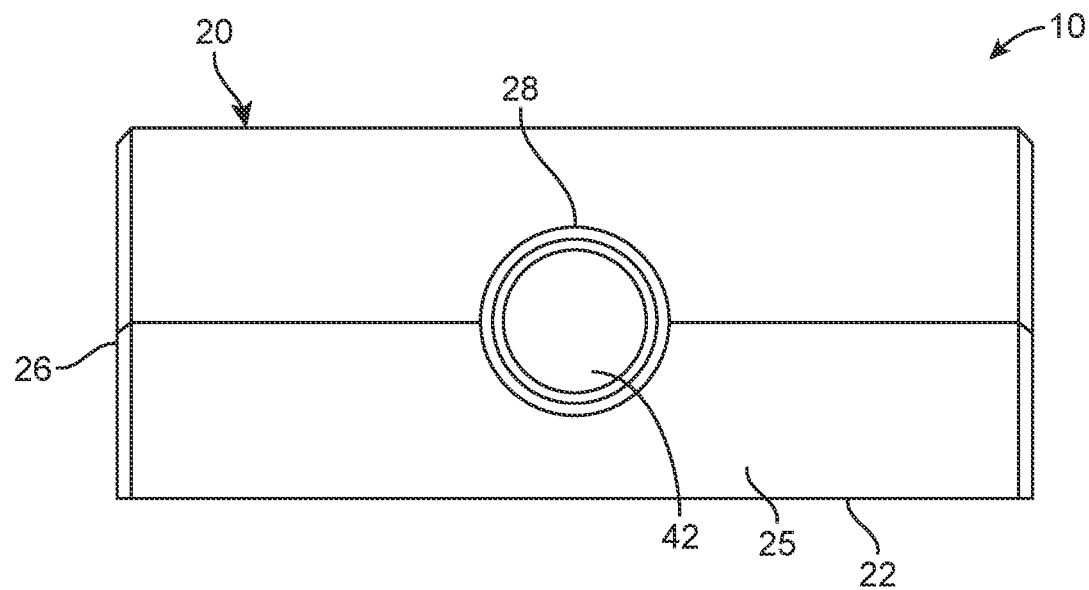
FIG. 4 is a representation of a rear view of housing assembly 20 in accordance to an embodiment of the present invention.
Figure 5:
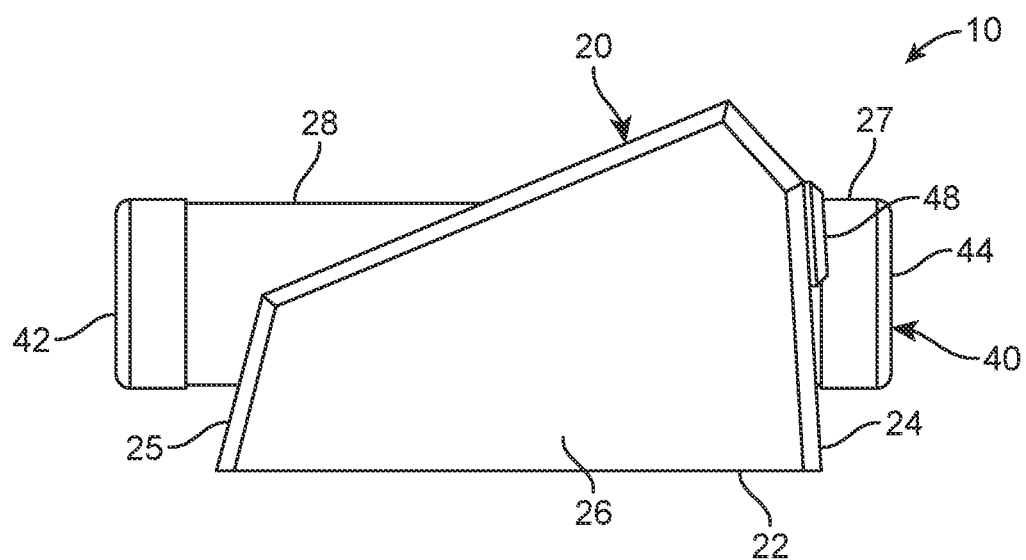
FIG. 5 shows a side view of housing assembly 20 in accordance to an embodiment of the present invention.

Housing assembly 40 further includes a front cylindrical portion 27 and a back cylindrical portion 28 which may be properly observed in FIGS. 2 and 5 of the provided drawings. In the present embodiment, front cylindrical portion 27 and back cylindrical portion 28 are provided as protective housing portion to house elements of communication assembly 40 therein. In one embodiment, front cylindrical portion 27 and back cylindrical portion 28 are each provided as having the same diameter. Additionally, it can be observed in FIG. 5, that front cylindrical portion 27 extends outwardly from slanted front end 24 and back cylindrical portion 28 extends outwardly from slanted back end 25. It can also be observed, that back cylindrical portion 28 extends outwardly at a length that is greater than an extension length of front cylindrical portion 27. Further, both portions are made of the durable metal material previously described in the specification.

Communication assembly 40 includes an outward facing camera 42 and an interior facing camera 44 housed within housing assembly 20. Specifically, outward facing camera 42 is housed within back cylindrical portion 28 of slanted back end 25 of the housing assembly 20. The back cylindrical portion 28 provides the necessary protective housing to protect the camera 42 stored therein. Further interior facing camera 44 is housed within front cylindrical portion 27 of slanted front end 24 of housing assembly 20. Front cylindrical portion 27 provides the necessary protective housing to protect the camera 44 stored therein. In the event of a crash, the protective housing will prevent the destruction of the cameras, allowing them to continue recording during severe vehicle accidents. In the present embodiment, both cameras are provided as wide-angle cameras which record a wide view of their respective location. Interior facing camera 44 records the interior portion of vehicle 50. Additionally, outward facing camera 42 is directed towards the front windshield of vehicle 50 and records a forward direction of vehicle 50. When mounted in the system 10, outward facing camera 42 and interior facing camera 44 provide a 360-degree view with respect to the location of housing assembly 20.

Communication assembly 40 further includes a microphone sensor 46 located on slanted front end 24 of housing assembly 20. As observed in FIG. 2, microphone sensor 46 may be provided as circular microphones which are arranged in a circular configuration. Microphone sensor 46 records audio from within vehicle 50 and stores that data into internal storage of the housing. Communication assembly 40 further includes a GPS based locating system 48 which serves as an internal tracker for vehicle 50. The tracker serves as an aid in the event of vehicle theft allowing law enforcement to track down the stolen vehicle. In the present embodiment, a user may access the location of vehicle 50 through the locating system 48. This information may then be forwarded to first responders or law enforcement to aid in the event of an accident. The location system also records the path taken by the vehicle on a map and stores it within the device. A USB port 49 is also provided on slanted front end 24 of the housing assembly 20. USB port 49 provides access to a data storage device within the housing to store data which is recorded by communication assembly 40.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An auto vehicle event recording box system, comprising:
   a) a housing assembly including a base, a slanted front end, a slanted back end and sidewalls forming an enclosure, a front cylindrical portion extending from said slanted front end, a back cylindrical portion extending from said slanted back end, wherein said back cylindrical portion extends outwardly at a length greater than a length of said front cylindrical portion; and
   b) a communication assembly including an outward facing camera mounted within said back cylindrical portion and an interior facing camera mounted within said front cylindrical portion, wherein said outward facing camera and said interior facing camera are wide angle cameras, a microphone configured to record sound, a GPS based location system which provides a location of said housing assembly.

2. The auto vehicle event recording box system of claim 1 wherein said base is rectangular in shape.

3. The auto vehicle event recording box system of claim 1 wherein said base is mounted to a platform provided for a dashboard of a vehicle.

4. The auto vehicle event recording box system of claim 3 wherein said outward facing camera is directed to a front windshield of said vehicle.

5. The auto vehicle event recording box system of claim 3 wherein said interior facing camera is directed toward an interior portion of said vehicle.

6. The auto vehicle event recording box system of claim 1 wherein said slanted front-end slants at an angle greater than an angle of said slanted back end.

7. The auto vehicle event recording box system of claim 1 wherein said housing assembly is made entirely of a chromium material.

8. The auto vehicle event recording box system of claim 1 wherein said microphone is located on said slanted front end.

9. The auto vehicle event recording box system of claim 1 wherein said communication assembly further includes a USB port on said slanted front end.

10. An auto vehicle event recording box system, comprising:
   a) a vehicle including an interior having a dashboard, a platform located on a top end of said dashboard;
   b) a housing assembly including a base having a rectangular shape mounted to said platform, said housing assembly located entirely within and area of said platform, a slanted front end extending from a front edge of said base, wherein said slanted front end slants inwardly toward said base, a slanted back end extending from a back edge of said base, wherein said slanted back end slants inwardly toward said base, a top portion connecting said slanted front end and said slanted back end, sidewalls extending vertically from sides of said base to form an enclosure, a front cylindrical portion extending from said slanted front end, a back cylindrical portion extending from said slanted back end, wherein said back cylindrical portion extends at a length greater than a length of said front cylindrical portion, wherein said housing assembly is made entirely of a chromium material; and
   c) a communication assembly including an outward facing camera housed within said back cylindrical portion, wherein said outward facing camera is a wide angle camera directed toward a front windshield of said vehicle, said communication assembly further including an interior facing camera housed within said front cylindrical portion, wherein said interior facing camera is directed toward an interior of said vehicle, wherein said communication assembly further includes a microphone sensor located on said slanted front end, wherein said communication assembly further includes a GPS-based locating system which records a traveled location of said vehicle, said communication assembly further including a USB port on said slanted front end, wherein said USB port provides access to a data storage device within said housing assembly.

* * * * *